United States Patent
Nagai et al.

(10) Patent No.: US 6,928,922 B2
(45) Date of Patent: Aug. 16, 2005

(54) LUBRICATING STRUCTURE FOR HYDRAULIC DRIVING APPARATUS

(75) Inventors: Shigekazu Nagai, Adachi-ku (JP); Akio Saitoh, Kawaguchi (JP); Kotaro Nagai, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/968,128

(22) Filed: Oct. 20, 2004

(65) Prior Publication Data

US 2005/0087068 A1    Apr. 28, 2005

(30) Foreign Application Priority Data

Oct. 23, 2003  (JP) .............................. 2003-363409

(51) Int. Cl.[7] ............................................. F01B 31/10
(52) U.S. Cl. ........................... 92/160; 92/168; 277/438
(58) Field of Search .................. 92/153, 160, 165 R, 92/168, 163, 164; 277/436–439, 908

(56) References Cited

U.S. PATENT DOCUMENTS 5,480,161 A * 1/1996 Borowski .................. 277/419

6,615,705 B2 * 9/2003 Reinelt et al. ................ 92/153

FOREIGN PATENT DOCUMENTS

| EP | 0 547 009 | 6/1993 |
|---|---|---|
| JP | 5-248412 | 9/1993 |
| JP | 2003-139108 | 5/2003 |

OTHER PUBLICATIONS

Co-pending U.S. Appl. No. 10/902,044 by Shigekazu Nagai et al., filed on Jul. 30, 2004.

* cited by examiner

Primary Examiner—Edward K. Look
Assistant Examiner—Devin Hanan
(74) Attorney, Agent, or Firm—Paul A. Guss

(57) ABSTRACT

Seal sections, which support first and second piston rods, are provided on inner circumferential surfaces of first and second cover members of a cylinder mechanism. A lubricant is supplied via supply passages and oil supply ports to first oil-retaining members, which are installed in installation grooves provided in the seal sections. The lubricant, which has characteristics different from those of an operation oil used for driving a piston of the cylinder mechanism, is retained by the first oil-retaining members. Further, the lubricant is supplied to clearances formed between the first and second cover members and the first and second piston rods, thereby forming an oil film.

14 Claims, 7 Drawing Sheets

LUBRICATING STRUCTURE FOR HYDRAULIC DRIVING APPARATUS

BACKGROUND OF THE INVENTION

1. Field of the Invention

The present invention relates to a lubricating structure for a hydraulic driving apparatus, for driving a drive shaft under a pressing action effected using an operation oil.

2. Description of the Related Art

A hydraulic driving apparatus, which is driven by the aid of a pressure fluid (for example, pressure oil), has been hitherto used, for example, in order to transport a workpiece and/or for positioning the workpiece.

For example, in the case that a hydraulic actuator is used as a hydraulic driving apparatus, a piston, which is displaceable in an axial direction, is provided in a cylindrical main cylinder body, the main cylinder body having both ends closed by a pair of closing members. Pressurizing chambers are provided on respective end sides of the piston. Operation oil is supplied into the pressurizing chambers by the aid of a hydraulic connecting member disposed outside of the main cylinder body. The piston makes rectilinear motion in the axial direction under the pressing action effected by the operation oil.

A shaft-shaped piston rod is axially attached to one end of the piston. The piston rod is inserted through a hole in one of the closing members, and thus the piston rod is supported displaceably in the axial direction. Plural seal members are installed along the inner circumferential surface of the closing member. Liquid tightness is retained for the operation oil in the pressurizing chamber because the seal members make contact with and seal the outer circumferential surface of the piston rod, so that the outer circumferential surface of the piston rod is surrounded thereby (see, for example, Japanese Laid-Open Patent Publication No. 5-248412).

In the case of the hydraulic actuator disclosed in Japanese Laid-Open Patent Publication No. 5-248412, when operation oil is supplied to the pressurizing chamber of the main cylinder body, and the piston is displaced in the axial direction, the piston rod, which is connected to the piston, is displaced along the hole of the closing member. In this situation, the seal members installed in the hole make continuous sealing contact with the outer circumferential surface of the piston rod, and hence sliding resistance arises between the seal members and the piston rod. Therefore, for mitigating sliding resistance between the seal members and the piston rod, the seal members are lubricated with operation oil. Specifically, the operation oil, which is supplied to the pressurizing chamber, also is supplied to the hole of the closing member in which the seal members are installed.

However, the operation oil, which lubricates the seal members, originally is supplied to the pressurizing chamber in order to drive the piston. The operation oil produces optimum characteristics when the operation oil is allowed to flow through a fluid circuit (for example, an operation oil supply source and supply tube passages) to which the operation oil is supplied. As a result, the operation oil, which is supplied to the seal members, does not have characteristics optimally suitable for lubrication. Therefore, it is feared that lubrication of the seal members is insufficient, resulting in deterioration of the durability of the seal members.

SUMMARY OF THE INVENTION

A general object of the present invention is to provide a lubricating structure for a hydraulic driving apparatus, which makes it possible to improve durability of a liquid tightness-retaining section, by supplying another lubricant to the liquid tightness-retaining section, the lubricant being different from the operation oil that is supplied for driving the piston.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
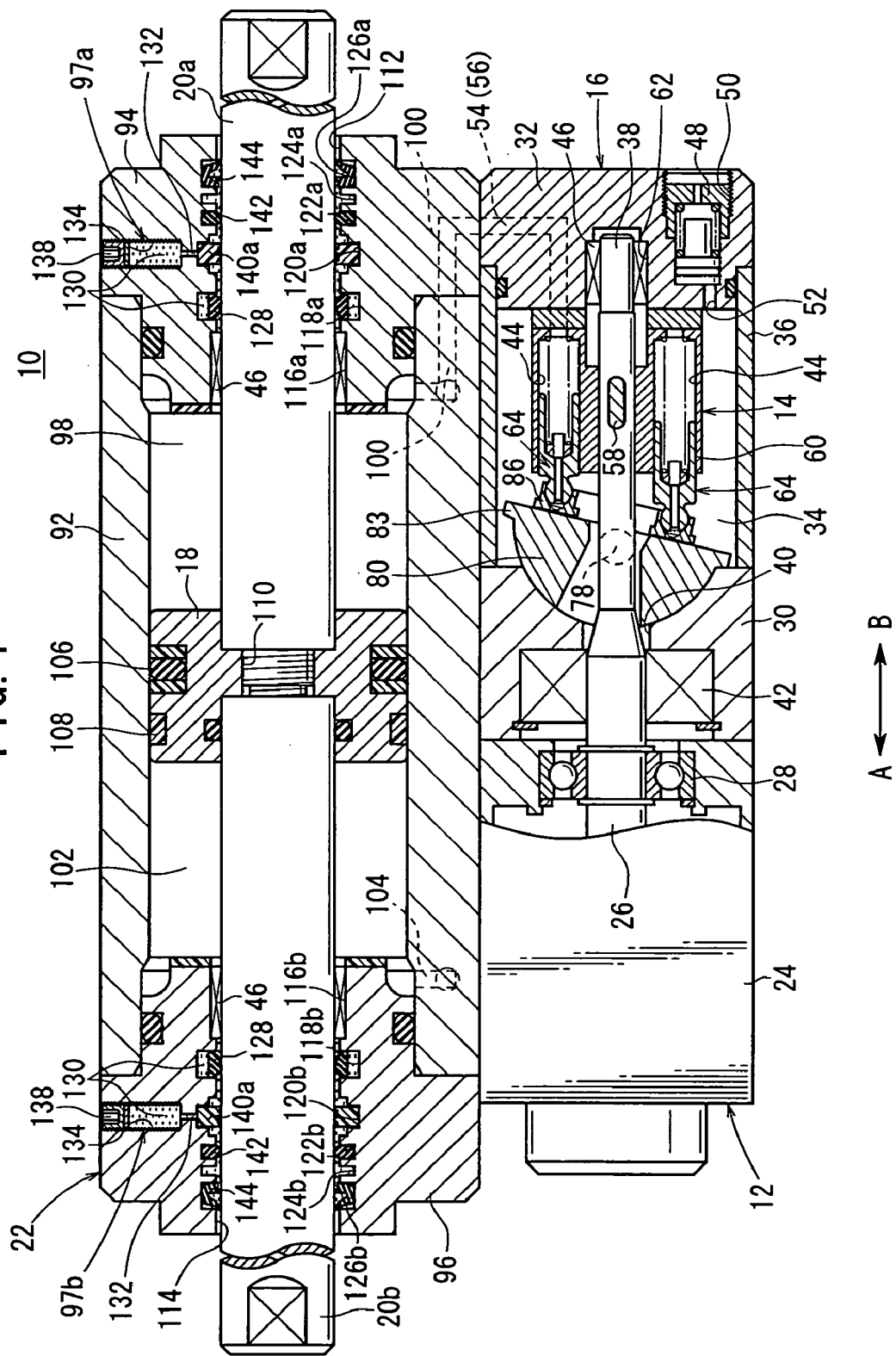
FIG. 1 shows a longitudinal sectional view illustrating an actuator to which a lubricating structure for a hydraulic driving apparatus according to a first embodiment of the present invention is applied.

With reference to FIG. 1, reference numeral 10 indicates an actuator to which a lubricating structure for a hydraulic driving apparatus according to a first embodiment of the present invention is applied.

The actuator (hydraulic driving apparatus) 10 comprises a pump-driving unit 12, which is driven and rotated in accordance with a current, and a pump mechanism 16 including a sucking/discharging section 14, which is integrally connected to the side of the pump-driving unit 12 and which is energized/deenergized by the pump-driving unit 12. The actuator 10 further comprises a cylinder mechanism 22, which is integrally provided on the pump-driving unit 12 and the pump mechanism 16, and which includes a piston 18 that makes displacement in the axial direction in accordance with the supply of operation oil, and first and second piston rods (drive shafts) 20a, 20b connected coaxially with respect to the piston 18.

The pump-driving unit 12 is composed of, for example, any one of an induction motor, a brush motor, and a DC motor. The pump-driving unit 12 has a rotary driving source 24, which is driven and rotated in accordance with a current supplied from an unillustrated power source. A drive shaft 26 is provided for the rotary driving source 24, protruding from one end thereof toward the pump mechanism 16. The drive shaft 26 is rotated integrally under the rotary action of the rotary driving source 24. The drive shaft 26 is supported rotatably by a first bearing 28 arranged in the rotary driving source 24.

Figure 2:
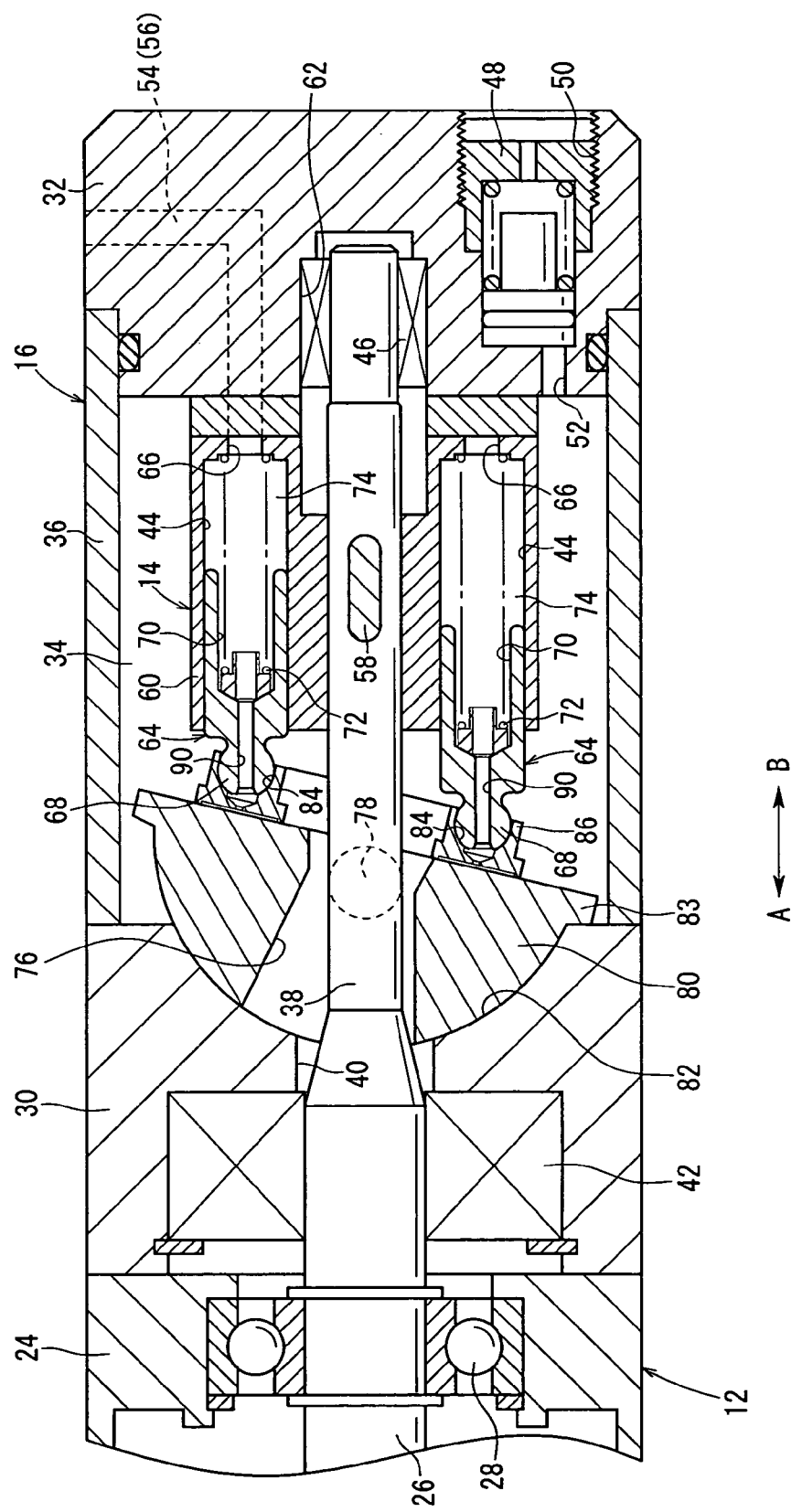
FIG. 2 shows a magnified longitudinal sectional view illustrating a pump mechanism for the actuator shown in FIG. 1.

As shown in FIG. 2, the pump mechanism 16 comprises a pump body 30, which is integrally connected to a side portion of the pump-driving unit 12, and a cylindrical casing 36, which has one end thereof connected to the pump body 30 and the other end thereof tightly sealed by an end block 32, and which has an operation oil-charging chamber 34 formed therein. The pump mechanism 16 further comprises a rotary shaft 38, which penetrates through the interior of the operation oil-charging chamber via the pump body 30, and a sucking/discharging section 14, which is rotatable integrally with the rotary shaft 38 under a rotary action of the rotary shaft 38.

An insertion hole 40, which penetrates in the axial direction, is formed in the pump body 30. The rotary shaft 38, which is connected integrally and coaxially to the drive shaft 26 of the rotary driving source 24, is inserted through the insertion hole 40. One end of the rotary shaft 38 is supported rotatably by the aid of a second bearing 42 arranged in the pump body 30. The other end of the rotary shaft 38 is supported by a bush 46, which is installed in a bush hole 62 provided in the end block 32.

An installation hole 50, in which a pressure-adjusting plug 48 is installed, is formed in the end block 32, so that the installation hole 50 is open to the outside. The installation hole 50 communicates with the inside of the operation oil-charging chamber 34 via a communication hole 52. The pressure-adjusting plug 48 is screw-engaged with the installation hole 50. The pressure of the operation oil charged in the operation oil-charging chamber 34 can be freely adjusted under a screwing action of the pressure-adjusting plug 48. An accumulator (not shown), which functions as a retaining mechanism capable of retaining a predetermined amount of operation oil, may be connected in place of the pressure-adjusting plug 48.

First and second fluid passages 54, 56, which communicate with the operation oil-charging chamber 34 and through which the operation oil flows, are formed in the end block 32. The first fluid passage 54 and the second fluid passage 56 are separately formed independently while being separated from each other by a predetermined spacing distance.

As shown in FIG. 1, the first fluid passage 54 communicates with a first cylinder chamber 98 via a first passage 100 formed both through a first cover member 94 and a cylinder tube (body) 92 of the cylinder mechanism 22, as described later on. The second fluid passage 56 communicates with a second cylinder chamber 102 via a second passage 104 formed through the cylinder tube 92 of the cylinder mechanism 22, as described later on.

As shown in FIG. 2, a sucking/discharging section 14 is provided in the pump mechanism 16. The sucking/discharging section 14 comprises a cylinder block 60, which is fitted to a central portion of the rotary shaft 38 by the aid of a key member 58, and which is rotatable integrally with the rotary shaft 38. The cylinder block 60 comprises a plurality of holes 44 which are arranged and separated from each other by predetermined angles in the circumferential direction, a plurality of pump pistons 64 which are provided substantially in parallel to the axis of the rotary shaft 38 and which are slidable along the holes 44 of the cylinder block 60, and operation oil holes 66 which are formed in the cylinder block 60 on a side facing the end block 32 and which communicate with the holes 44.

Spherical sections 68, each having a substantially spherical shape, are formed on one end side of the pump pistons 64. Recesses 70, which are depressed inside toward the one end side, are formed on the other end side of the pump pistons 64. Springs 72 are interposed between the respective recesses 70 and the holes 44 of the cylinder block 60. Repulsive forces of the springs 72 allow the pump pistons 64 to be always in a state of being pressed toward the pump-driving unit 12 (in the direction of arrow A). Respective chambers 74 are formed, each of which is closed and defined by one of the holes 44 of the cylinder block 60 and the respective recesses 70 of the pump pistons 64 disposed in the holes 44. Each chamber 74 functions both as an operation oil-sucking chamber and an operation oil-discharging chamber.

The sucking/discharging section 14 further comprises a tilting member 80, having a through-hole 76 so that the tilting member 80 does not make contact with the rotary shaft 38. The tilting member 80 is connected to an adjusting lever (not shown) axially supported by the casing 36 through the aid of a connecting shaft 78, whereby the tilting member 80 is tiltable by a predetermined angle. The tilting member 80 is formed to have a substantially semicircular cross section. The tilting member 80 is supported tiltably by the aid of the connecting shaft 78. The tilting member 80 is installed so as to be in engagement with a depression 82, having a substantially semicircular cross section, formed in the pump body 30, on a side thereof facing toward the end block 32. An internal stopper 83, which protrudes radially outward by a predetermined length, is formed on the outer circumferential surface of the tilting member 80.

A retaining section 86, which has an annular groove 84 that engages with spherical sections 68 of the plurality of pump pistons 64, is formed on the tilting member 80, on a side thereof facing toward the end block 32.

On the other hand, as shown in FIG. 2, lubrication performance is retained by supplying operation oil, via passages 90 communicating with the recesses 70, to the sliding portions between the annular groove 84 of the retaining section 86 of the tilting member 80 and the spherical sections 68 of the pump pistons 64.

As shown in FIG. 1, the cylinder mechanism 22 is disposed integrally on the pump-driving unit 12 and the pump mechanism 16, such that the cylinder mechanism 22 is provided substantially in parallel to the axis of the pump-driving unit 12 and the pump mechanism 16.

The cylinder mechanism 22 comprises a cylindrical cylinder tube 92, first and second cover members 94, 96 which close the ends of the cylinder tube 92 respectively, a piston 18 installed internally in the cylinder tube 92 and which is displaceable in the axial direction, and first and second piston rods 20*a*, 20*b* which are coaxially connected with the piston 18 intervening therebetween.

The cylinder mechanism 22 further comprises seal sections (liquid tightness-retaining sections) 97*a*, 97*b* which are installed to the inner circumferential surfaces (inner wall surfaces) of the first and second cover members 94, 9& respectively, and which make contact with and seal the outer circumferential surfaces of the first and second piston rods 20*a*, 20*b* to retain liquid tightness.

The first cover member 94 is arranged on one end of the cylinder tube 92, on a side facing one end surface of the piston 18. The first cylinder chamber 98 is formed in the cylinder tube 92 between the first cover member 94 and the one end surface of the piston 18. The first cover member 94 includes a first passage 100, which is formed at a position opposed to the first fluid passage 54 formed in the end block 32 of the pump mechanism 16. The first passage 100 extends substantially perpendicularly toward the cylinder tube 92 and communicates with the first cylinder chamber 98.

On the other hand, the second cover member 96 is arranged on another end of the cylinder tube 92, on a side facing the other end surface of the piston 18. A second cylinder chamber 102 is formed in the cylinder tube 92 between the second cover member 96 and the other end surface of the piston 18. The second cover member 96 includes a second passage 104, which is formed at a position opposed to the second fluid passage 56 formed in the end block 32 of the pump mechanism 16. The second passage 104 extends substantially perpendicularly toward the cylinder tube 92 and communicates with the second cylinder chamber 102.

That is, the first cylinder chamber 98 communicates with the first fluid passage 54 of the pump mechanism 16 via the first passage 100. Operation oil, contained in the operation oil-charging chamber 34 of the pump mechanism 16, is supplied/discharged via the first passage 100 and the first fluid passage 54. Similarly, the second cylinder chamber 102 communicates with the second fluid passage 56 of the pump mechanism 16 via the second passage 104. Operation oil, contained in the operation oil-charging chamber 34, is supplied/discharged via the second passage 104 and the second fluid passage 56.

The piston 18 includes an annular piston packing 106, which is provided in an annular groove on an outer circumferential surface of the piston 18, inscribing the cylinder tube 92. An annular wear ring 108 is also provided on the piston 18, separated from the piston packing 106 by a predetermined spacing distance. Accordingly, liquid tightness is retained between the first cylinder chamber 98 and the second cylinder chamber 102, by the aid of the piston packing 106 and the wear ring 108 respectively. The piston 18 is displaceable in the axial direction under the action of operation oil supplied to the first cylinder chamber 98 and the second cylinder chamber 102.

A screw hole 110, having engraved threading, is formed at a substantially central portion of the piston 18. One end of an elongate first piston rod 20a is screw-engaged with the piston 18 on one side of the first cover member 94. The other end of the first piston rod 20a is exposed to the outside via a first support hole 112 formed in the first cover member 94, so that the first piston rod 20a is supported displaceably in the axial direction.

On the other hand, one end of the second piston rod 20b is connected to a substantially central portion on another side surface of the piston 18 by the aid of the screw hole 110. The other end of the second piston rod 20b is exposed to the outside via a second support hole 114 formed in the second cover member 96, so that the second piston rod 20b is supported displaceably in the axial direction.

Seal-sections 97a, 97b, which retain liquid tightness in the first and second cylinder chambers 98, 102, comprise a plurality of annular grooves formed in the first and second support holes 112, 114.

Figure 3:
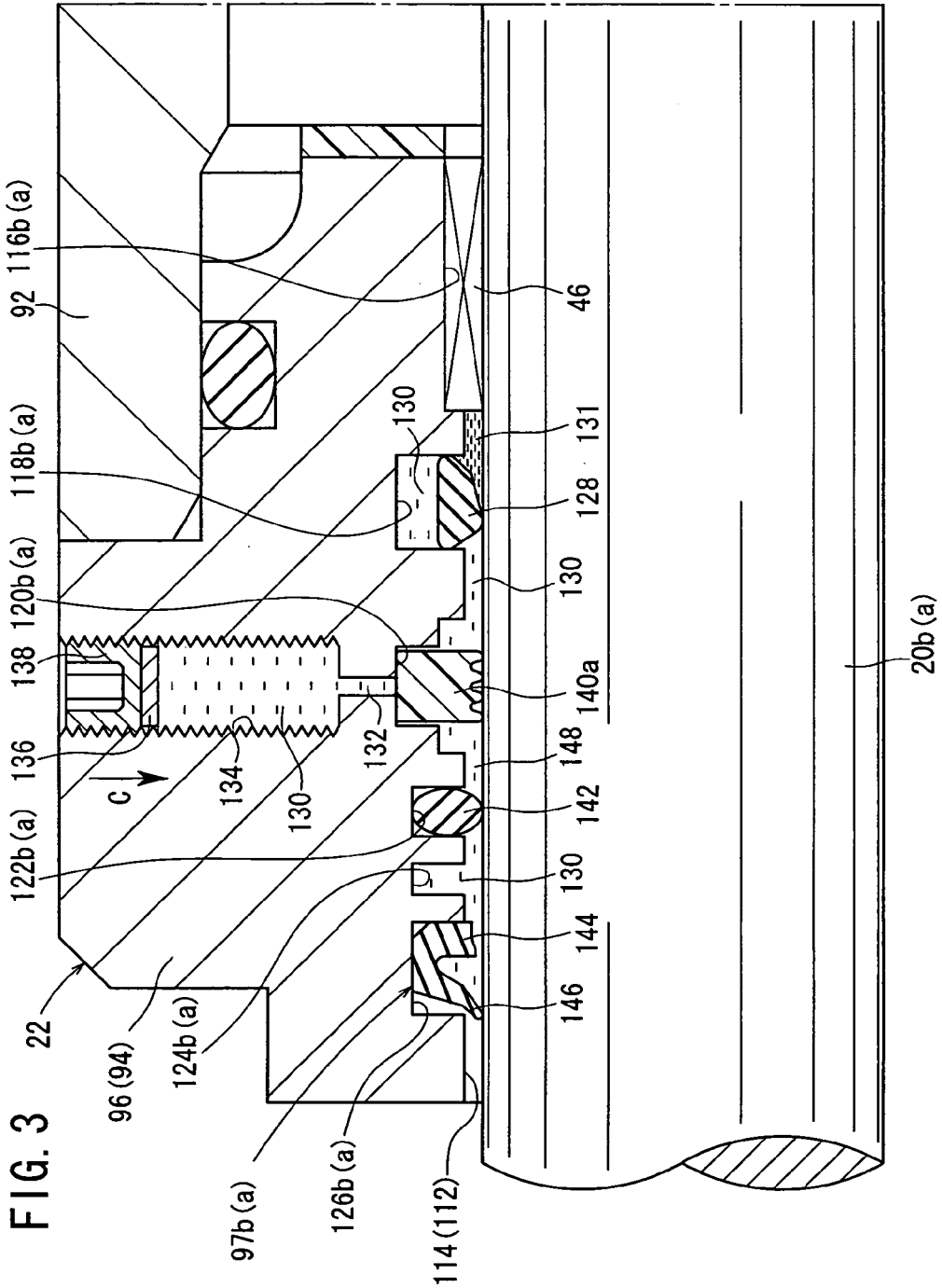
FIG. 3 shows a partial magnified longitudinal sectional view illustrating the structure and constituent elements thereof disposed in the vicinity of a seal section of the actuator shown in FIG. 1.

As shown in FIG. 3, a plurality of annular grooves are formed in the first and second support holes 112, 114 while being separated from each other by predetermined spacing distances in the axial direction of the first and second support holes 112, 114 respectively. Bush grooves 116a, 116b, first packing grooves 118a, 118b, installation grooves (grooves) 120a, 120b, second packing grooves 122a, 122b, retaining grooves (oil-charging grooves) 124a, 124b, and annular recesses 126a, 126b are formed in this order on the inner circumferential surfaces of the first and second support holes 112, 114, in a direction oriented away from the piston 18 to make separation from the piston 18.

Annular bushes 46 are installed in each of the bush grooves 116a, 116b. Inner circumferential surfaces of the bushes 46 contact the outer circumferential surfaces of both the first and second piston rods 20a, 20b. The bushes 46 thereby support the first and second piston rods 20a, 20b displaceably in the axial direction, within the first and second support holes 112, 114.

Each of the first packing grooves 118a, 118b has an annular shape, while being recessed a predetermined depth from the inner circumferential surface of each of the first and second cover members 94, 96. A first rod packing (operation oil-blocking member) 128 is installed in each of the first packing grooves 118a, 118b. The first rod packing 128 is formed to have a substantially D-shaped cross section expanding toward the outer circumferential surface of each of the first and second piston rods 20a, 20b. A lubricant (for example, grease) 130 is charged beforehand between the outer circumferential surface of the first rod packing 128 and each of the first packing grooves 118a, 118b when the first rod packings 128 are installed.

That is, the lubricant 130 is tightly sealed between the outer circumferential surfaces of the first rod packings 128 and each of the first packing grooves 118a, 118b. Therefore, the lubricant 130 does not leak in a direction toward the first and second piston rods 20a, 20b.

The first rod packing 128 is used to retain liquid tightness for operation oil 131, which is supplied from the pump mechanism 16 into each of the first and second cylinder chambers 98, 102.

Each of the installation grooves 120a, 120b communicates via supply passages 132 with an oil supply port 134, which opens onto an outer circumferential side of each of the first and second cover members 94, 96. A female thread is engraved on the inner circumferential surface of the oil supply port 134. A lubricant (for example, grease) 130 is charged into the oil supply port 134, and then a disk-shaped lid member (plate member) 136, which is composed of an elastic material (for example, rubber), is inserted. A plug (closing member) 138 is screw-engaged with the oil supply port 134 over the lid member 136, and thus the oil supply port 134 is closed.

The following arrangement may also be adopted. That is, the plug 138, which closes the oil supply port 134, may have an unillustrated through-hole formed at a substantially central portion of the plug 138, so as to provide a state in which outside air communicates with a space between the lower surface of the plug 138 and the upper surface of the lid member 136 via the through-hole. With such an arrangement, when pressure fluid is supplied to the space via the through-hole, to apply pressure to the lid member 136, the lid member 136 is displaced in a direction (direction of arrow C in FIG. 3) toward the installation groove 120a, 120b, so that the lubricant 130, which is charged in the oil supply port 134, is pressed toward the installation groove 120a, 120b.

The lubricant 130, which is composed of grease or the like, is an oil having characteristics different from those of the operation oil 131 that is supplied into the pump mechanism 16 and the cylinder mechanism 22. More specifically, the lubricant 130 has a viscosity that is larger than the viscosity of the operation oil 131. For example, the viscosity of the operation oil 131 is within a range of 32 to 460 cSt, while the viscosity of the lubricant 130 is within a range of 32 to 100,000 cSt.

On the other hand, a first oil-retaining member 140a, which has a substantially rectangular cross section, is installed in each of the installation grooves 120a, 120b. The first oil-retaining member 140a is formed of a porous resin material, such as PVF (Poly Vinyl Fluoride) resin, having a plurality of small pores, and the inner circumferential surface thereof is formed with a wave-like configuration in the circumferential direction.

That is, the first oil-retaining member 140a is formed of the porous member composed of the resin material such as PVF resin. Therefore, a lubricant 130, which is supplied from the oil supply port 134, permeates into the first oil-retaining member 140a via the plurality of small pores therein, and the lubricant 130 is satisfactorily retained within the first oil-retaining member 140a.

The plug 138, which is screw-engaged with the oil supply port 134, is screwed to cause displacement thereof in a direction (direction of arrow C in FIG. 3) toward each of the installation grooves 120a, 120b. Accordingly, the lubricant 130 is pressed by the plug 138 and the lid member 136 against the first oil-retaining member 140a. Therefore, the lubricant 130 can be favorably infused into and contained within the first oil-retaining member 140a. The lubricant 130 preferably is used for lubricating the first and second piston rods 20a, 20b and the seal sections 97a, 97b.

Second packing grooves 122a, 122b are formed annularly along the inner circumferential surfaces of each of the first and second cover members 94, 96. A second rod packing 142, having a substantially elliptic cross section, is installed in each of the second packing grooves 122a, 122b. The second rod packing 142 may be formed of, for example, an elastic material such as NBR (nitrile rubber). Alternatively, the second rod packing 142 may be formed of a resin material, such as PVF resin, in the same manner as the first oil-retaining member 140a, to retain the lubricant 130 therein.

Figure 4:
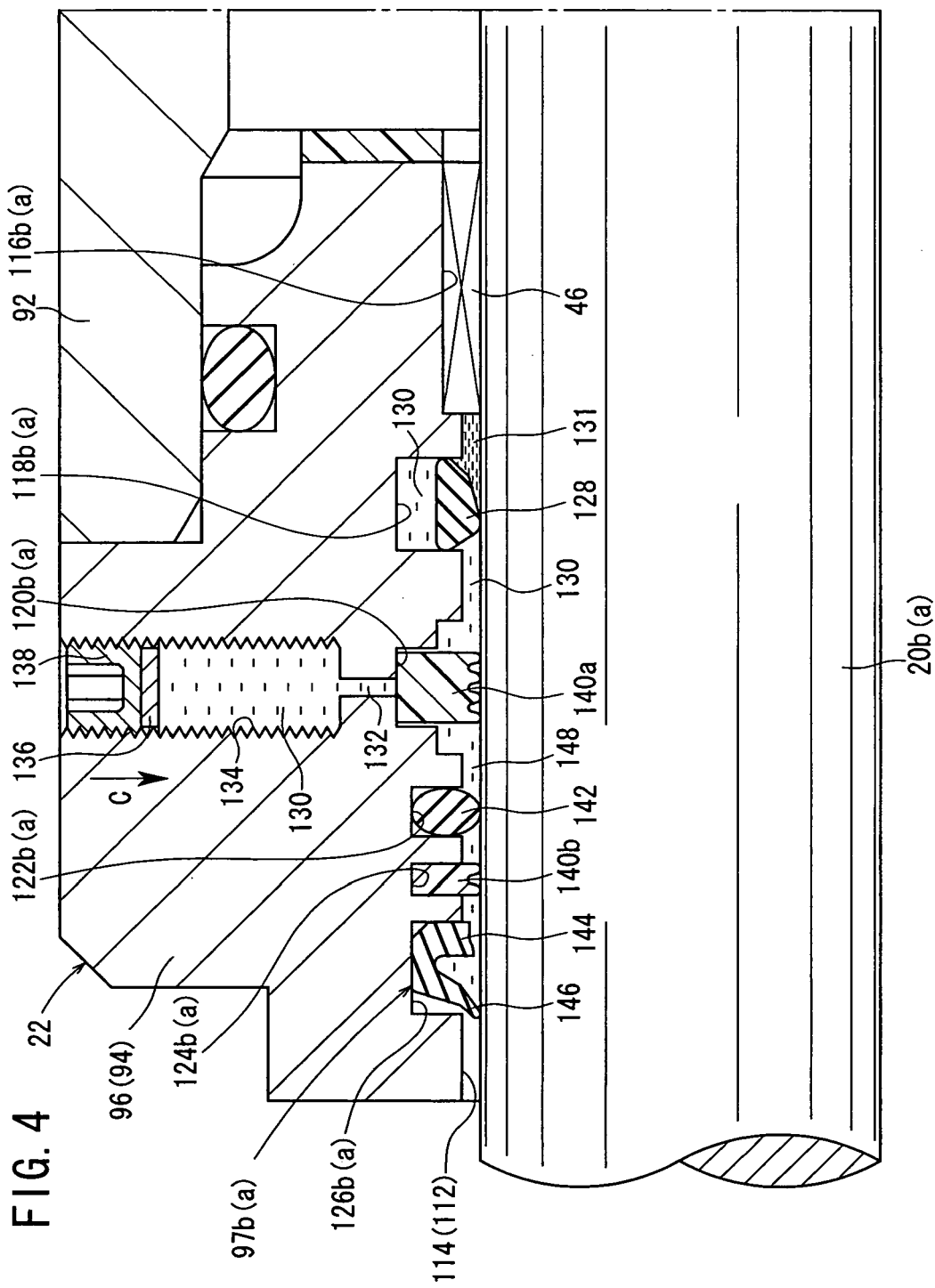
FIG. 4 shows a partial magnified longitudinal sectional view illustrating a state in which a second oil-retaining member is provided in a retaining groove shown in FIG. 3.

Each of the retaining grooves 124a, 124b is formed adjacently to the respective second packing grooves 122a, 122b. Lubricant 130, which is supplied from the oil supply port 134, is charged into each of the retaining grooves 124a, 124b via clearances 148 formed between the inner circumferential surface of each of the first and second cover members 94, 96 and the outer circumferential surface of each of the first and second piston rods 20a, 20b. That is, a predetermined amount of lubricant 130 is retained in the retaining grooves 124a, 124b, filling the depths thereof. As shown in FIG. 4, a second oil-retaining member 140b, which is composed of the same resin material (for example PVF resin) as that of the first oil-retaining member 140a installed in each of the installation grooves 120a, 120b, may be provided in each of the retaining grooves 124a, 124b, wherein the lubricant 130 charged into each of the retaining grooves 124a, 124b permeates and is retained within the second oil-retaining member 140b. In this case, the lubricant 130 can be retained more effectively in the retaining grooves 124a, 124b as compared with the case shown in FIG. 3, in which second oil-retaining members 140b are not provided in the retaining grooves 124a, 124b.

Annular recesses 126a, 126b are formed along the inner circumferential surface of each of the first and second cover members 94, 96, at positions separated farthest from the piston 18 in relation to each of the first and second cover members 94, 96. A dust-removing member 144 is provided in each of the annular recesses 126a, 126b. The dust-removing member 144 is formed of, for example, an elastic material such as NBR (nitrile rubber) and has a substantially U-shaped cross section. The dust-removing member 144 is formed with a forward end 146 which is gradually thin-walled, while being inclined by a predetermined angle in a direction toward ends of each of the first and second piston rods 20a, 20b. The forward end 146 is continuously in contact with and seals the outer circumferential surfaces of each of the first and second piston rods 20a, 20b.

On the other hand, when the first piston rod 20a is displaced to protrude to the outside from the first cover member 94, or when the second piston rod 20b is displaced to protrude to the outside from the second cover member 96, then, in some cases, dust or the like may be adhered to the outer circumferential surfaces of each of the first and second piston rods 20a, 20b. In such a situation, dust or the like, which adheres to the outer circumferential surface, is removed as a result of sealing contact of the dust-removing member 144 with each of the first and second piston rods 20a, 20b, when each of the first and second piston rods 20a, 20b is displaced inwardly again into each of the first and second cover members 94, 96. It is possible, therefore, to prevent invasion of dust or the like into the interior of the first and second cylinder chambers 98, 102.

A texture pattern, formed by concave and convex surface features, may be provided on the inner circumferential surfaces of each of the first and second rod packings 128, 142 and the dust-removing member 144. Accordingly, lubricant 130 can be effectively retained between the texture patterns, formed on each of the first and second rod packings 128, 142 and the dust-removing member 144, and the outer circumferential surface of each of the first and second piston rods 20a, 20b. Therefore, the seal sections 97a, 97b can be lubricated more effectively with the lubricant 130 to improve durability. Alternatively, concave/convex dimples may be provided on the outer circumferential surfaces of each of the first and second piston rods 20a, 20b, for example, by means of a shot peening process, so that the lubricant 130 is more effectively retained between the dimples and the seal sections 97a, 97b.

The actuator 10, having a lubricating structure for a hydraulic driving apparatus according to the first embodiment of the present invention, is basically constructed as described above. Next, its operation, function, and effect will be explained.

At first, an explanation shall be given concerning a case in which the lubricant 130 is charged, for example, into the installation grooves 120a, 120b from the oil supply ports 134 formed on the outer circumferential sides of the first and second cover members 94, 96.

The plug 138, which is screw-engaged with the oil supply port 134, is unscrewed to detach the plug 138 and the lid member 136 from the oil supply port 134, in order to supply the lubricant (for example, grease) 130.

Subsequently, a desired amount of lubricant 130 is charged into the oil supply port 134. After that, the lid member 136 is reinserted into the oil supply port 134 and the plug 138 is once again screw-engaged with the oil supply port 134. During this process, the plug 138, which is screw-engaged with the oil supply port 134, is displaced in a direction (direction of arrow C in FIG. 3) toward the installation grooves 120a, 120b as it is screwed inward. Accordingly, the lubricant 130 is pressed by the lid member 136 and forced toward the installation grooves 120a, 120b.

Thus, the lubricant 130 is supplied into the installation grooves 120a, 120b from the oil supply ports 134 and via the supply passages 132 under a pressing action effected by the lid member 136 and the plug 138. The lubricant 130, which is supplied into the installation grooves 120a, 120b, permeates the first oil-retaining member 140a, which is formed with multiple pores so that the lubricant 130 is retained therein. Further, the lubricant 130 is supplied to clearances 148 between each of the first and second cover members 94, 96 and each of the first and second piston rods 20a, 20b.

Finally, the lubricant 130 is charged into the retaining grooves 124a, 124b via the clearance 148, so that the lubricant 130 is retained therein. Further, the lubricant 130, which is supplied to the annular recesses 126a, 126b, is blocked by the forward ends 146 of the dust-removing members 144, which make contact with and seal the outer circumferential surface of each of the first and second piston rods 20a, 20b. Therefore, the lubricant 130 is prevented from leaking outside of each of the first and second cover members 94, 96.

When the lubricant 130 is supplied into the clearance 148, an oil film is formed between the inner circumferential surface of each of the first and second cover members 94, 96 and the outer circumferential surface of each of the first and second piston rods 20a, 20b. As a result, the first and second piston rods 20a, 20b can be smoothly displaced in the axial direction under the lubricating action effected by the lubricant 130. Further, it is possible to avoid the occurrence of rust, which otherwise would be formed on the first and second piston rods 20a, 20b.

The lubricant 130 has fluid characteristics (for example, viscosity and coefficient of viscosity) that are different from those of the operation oil 131 supplied into each of the first and second cylinder chambers 98, 102 of the cylinder mechanism 22. Thus, it is possible to use a lubricant 130 having optimum characteristics, for example, for the first and second rod packings 128, 142 of the seal sections 97a, 97b. Accordingly, durability of the seal sections 97a, 97b can be improved, as compared with the conventional technique in which an identical operation oil is used both for facilitating displacement of the piston in the axial direction as well as for lubricating the seal sections, for slidably supporting the piston rods connected to the piston in the axial direction.

Next, an explanation shall be presented concerning the operation, function, and effect of the actuator 10, to which the lubricant 130 is supplied to the seal sections 97a, 97b of the first and second cover members 94, 96 of the cylinder mechanism 22, as described above. Further, a state is assumed, in which operation oil is charged beforehand, from an unillustrated operation oil supply source, into the operation oil-charging chamber 34.

An unillustrated power source is energized to drive and rotate the rotary driving source 24 of the pump-driving section 12. The drive shaft 26 is rotated under the driving action of the rotary driving source 24, and the rotary shaft 38, which is connected to the drive shaft 26, is integrally rotated therewith.

The cylinder block 60, which is fitted to the rotary shaft 38 by the aid of a key member 58, is also integrally rotated. The pump pistons 64, which are provided displaceably in the holes 44 of the cylinder block 60, are rotated about the center of the rotary shaft 38. The pump pistons 64 further are displaced in axial directions (directions of arrows A and B in FIG. 2) by the repulsive forces of the springs 72, in the state in which the spherical sections 68 of the pump pistons 64 are retained in the annular groove 84 of the retaining section 86 attached to the tilting member 80.

During this process, operation oil is charged into the chambers 74, each of which are surrounded and defined by the pump pistons 64 and the holes 44. When the pump pistons 64 are displaced to their bottom dead center positions nearest to the end block 32 (in the direction of arrow B in FIGS. 1 and 2), under a pressing action effected by the tilting member 80, operation oil, which has been charged in the chambers 74, is discharged via the operation oil holes 66 into the first fluid passage 54 due to the displacement action of the pump pistons 64 toward the end block 32. In contrast, when the pump pistons 64 are displaced to their top dead center positions nearest to the pump-driving section 12 (in the direction of arrow A in FIGS. 1 and 2) under a repulsive force of the springs 72, operation oil is sucked, via the operation oil hole 66, into the chambers 74 due to the displacement action of the pump pistons 64 toward the pump-driving section 12.

More specifically, when the pump pistons 64 are displaced to a position opposed to the first fluid passage 54 formed in the end block 32, the pump pistons 64 are being displaced toward their bottom dead center positions nearest to the end block 32 (in the direction of arrow B) under a pressing action effected by the tilting member 80. Stated otherwise, the opening to the first fluid passage 54 is disposed with respect to the cylinder block 60 such that as the operation oil holes 66 respectively pass over the opening to the first fluid passage 54, the pump pistons 64 are being displaced toward their bottom dead center positions, and operation oil is effectively pumped, by the pump pistons 64, into the first fluid passage 54. Therefore, operation oil, which is charged in the chambers 74, is discharged from the operation oil holes 66 into the first fluid passage 54. On the other hand, when the pump pistons 64 are displaced to the position opposed to the second fluid passage 56, the pump pistons 64 are being displaced toward their top dead center positions nearest to the pump-driving section 12 (in the direction of arrow A). Stated otherwise, the opening to the second fluid passage 56 is disposed with respect to the cylinder block 60 such that as the operation oil holes 66 respectively pass over the opening to the second fluid passage 56, the pump pistons 64 are being displaced toward their top dead center positions, and thus, operation oil is sucked through the operation oil holes 66 into the chambers 74. That is, the pump pistons 64 are rotated about the center of the rotary shaft 38, while repeatedly sucking and discharging operation oil with respect to the interior of the chambers 74, by repeating their displacement in the axial direction under the rotary action of the rotary shaft 38.

Operation oil, which is discharged by the pump pistons 64, serving as a discharge section, is delivered via the first fluid passage 54 formed in the end block 32 to the first passage 100 formed in the first cover member 94 and the cylinder tube 92. Thus, operation oil is supplied into the first cylinder chamber 98 of the cylinder mechanism 22 and the piston 18 is pressed toward the second cover member 96 (in the direction of arrow A) by the operation oil supplied to the first cylinder chamber 98. Accordingly, the first and second piston rods 20a, 20b are displaced integrally in the direction of the arrow A.

On the other hand, conversely to the above, when the piston 18 and the first and second piston rods 20a, 20b of the cylinder mechanism 22 are displaced toward the pump mechanism 16 (in the direction of arrow B), the polarity of the current supplied to the rotary driving source 24 is reversed. Accordingly, the rotary shaft 38, which is connected to the drive shaft 26 of the rotary driving source 24, is integrally rotated in a direction opposite to the above. Therefore, the cylinder block 60 of the pump mechanism 16 is rotated in the opposite direction by the aid of the rotary shaft 38. In this case, as the operation oil holes 66 respectively pass over the opening to the first fluid passage 54, the pump pistons 64 are being displaced away from their bottom dead center positions (in the direction of arrow A), and thus operation oil in the first cylinder chamber 98 is sucked via the first fluid passage 54 under the displacement action of the pump pistons 64. Further, as the operation oil holes 66 respectively pass over the opening to the second fluid passage 56, the pump pistons 64 are being displaced away from their top dead center positions (in the direction of arrow B), and thus operation oil is discharged to the second fluid passage 56 under the displacement action of the pump pistons 64.

Operation oil, which is discharged into the second fluid passage 56 formed in the end block 32, is supplied to the second cylinder chamber 102 of the cylinder mechanism 22 via the second passage 104 formed in the cylinder tube 92. The internal pressure of the second cylinder chamber 102 is raised. During this process, operation oil, which has been introduced into the first cylinder chamber 98, is discharged via the first passage 100 under a sucking action effected by the pump pistons 64 of the pump mechanism 16. The operation oil is returned into the operation oil-charging chamber 34 via the first fluid passage 54.

As a result, the piston 18 of the cylinder mechanism 22 is displaced toward the first cover member 94 (in the direction of arrow B) under a pressing action of the operation oil supplied into the second cylinder chamber 102. The first and second piston rods 20a, 20b are displaced integrally in the direction of arrow B under the displacement action of the piston 18.

As described above, in the embodiment of the present invention, different operation oils, which have different characteristics (for example, different viscosities), are used for the operation oil 131, which is supplied to the first and second cylinder chambers 98, 102 of the cylinder mechanism 22 by the aid of the pump mechanism 16 to displace the piston 18 of the cylinder mechanism 22 in the axial direction, and for the lubricant 130, which lubricates the seal sections 97a, 97b installed in the first and second cover members 94, 96 for supporting the first and second piston rods 20a, 20b connected to the piston 18.

Accordingly, it is possible to use an operation oil 131 having optimum characteristics for flowing through the fluid circuit, constructed by the pump mechanism 16 and the cylinder mechanism 22. Moreover, it is possible to use a lubricant 130 having optimum characteristics for lubricating the seal sections 97a and 97b. Therefore, the operation oil 131 flows successfully and smoothly into the interiors of the pump mechanism 16 and the cylinder mechanism 22. Further, durability can be improved, because the seal sections 97a, 97b are effectively lubricated by the lubricant 130.

More specifically, with respect to the characteristics of the operation oil 131 and the lubricant 130, the viscosity of the lubricant 130 supplied to the seal sections 97a, 97b is set to be larger than the viscosity of the operation oil 131 flowing through the interiors of the pump mechanism 16 and the cylinder mechanism 22.

When the amount of the lubricant 130, which is supplied, for example, to the installation grooves 120a, 120b and to the clearances 148 between the inner circumferential surfaces of the first and second cover members 94, 96 and the first and second piston rods 20a, 20b, decreases, then the plugs 138, which are installed in the oil supply ports 134 of each of the first and second cover members 94, 96, may be screwed, so that additional lubricant 130 is pressed in a direction toward the installation grooves 120a, 120b under the displacement action in the axial direction of the plug 138 and the lid member 136. Accordingly, it is possible to increase the amount of lubricant 130 supplied, for example, to the installation grooves 120a, 120b and the clearances 148.

The same operation oil used for driving the cylinder need not be used to lubricate the seal members, as compared with the conventional technique in which the same oil is used both as the operation oil for driving the piston in the cylinder as well as for lubricating the seal members. Therefore, the amount of consumption of operation oil can be reduced, and it is possible to decrease the number of maintenance operations required, for example, for replenishing operation oil when the operation oil is decreased. Further, a replenishing tank, which has been separately provided in order to replenish the operation oil, is unnecessary. Therefore, it is possible to reduce the number of parts, and accordingly, reduce the cost of the apparatus.

Figure 5:
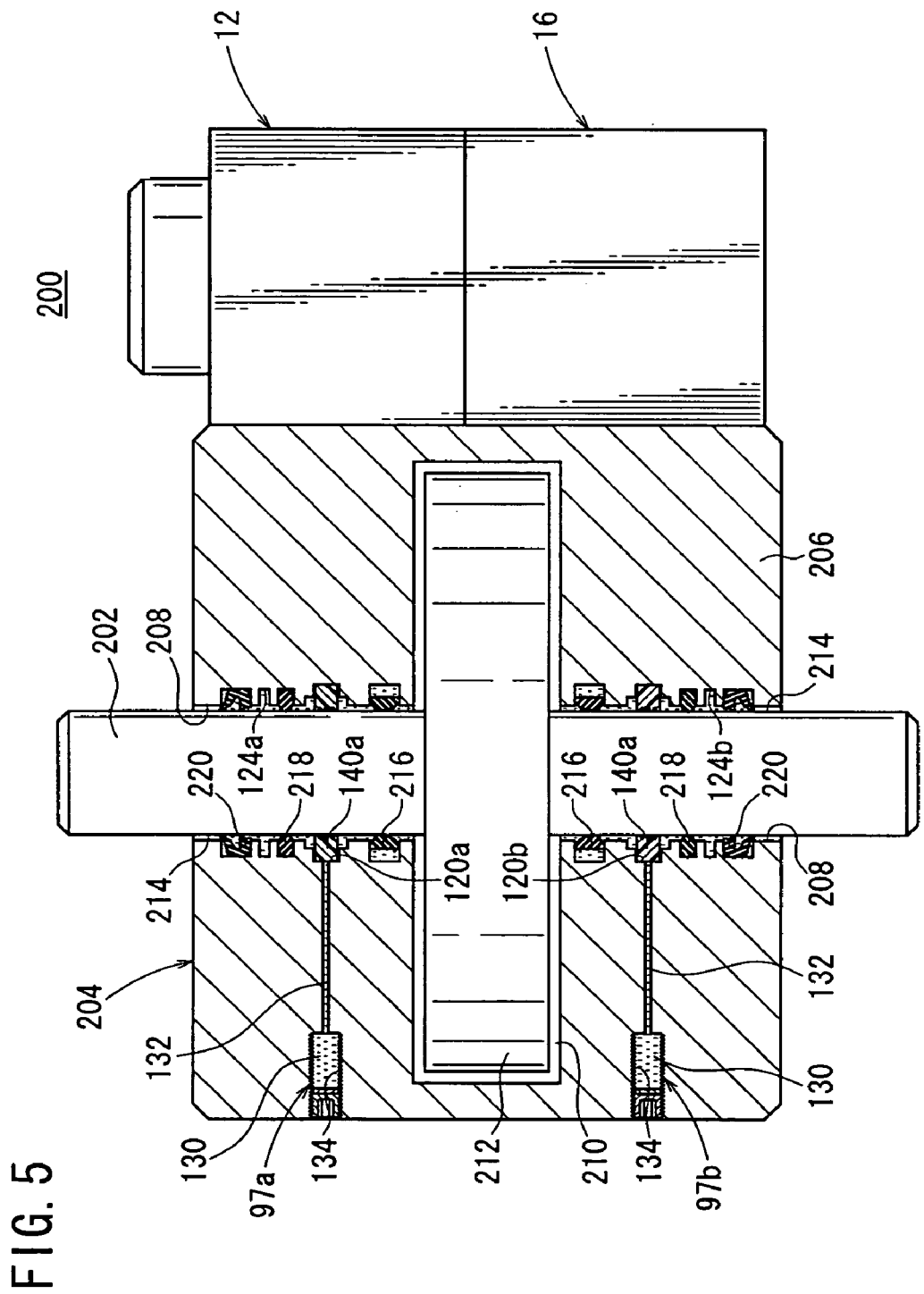
FIG. 5 shows, with partial omission, a longitudinal sectional view illustrating a rotary actuator, to which a lubricating structure for a hydraulic driving apparatus according to a second embodiment of the present invention is applied.

Next, FIG. 5 shows a rotary actuator (hydraulic driving apparatus) 200 to which a lubricating structure for a hydraulic driving apparatus according to a second embodiment of the present invention is applied. The same constitutive components as those of the actuator 10, employing the lubricating structure according to the first embodiment, as described above, are designated by the same reference numerals, and detailed explanation thereof shall be omitted.

The rotary actuator 200, to which the lubricating structure for a hydraulic driving apparatus according to the second embodiment is applied, comprises a pump-driving section 12, which is driven and rotated in accordance with a supplied current, a pump mechanism 16, which is integrally connected to the side of the pump-driving section 12 and which includes a sucking/discharging section that is energized/deenergized by the pump-driving section 12, and a rotary driving mechanism 204, which is integrally disposed on sides of the pump-driving section 12 and the pump mechanism 16, and which is driven rotatably about the center of a rotary shaft (drive shaft) 202 in accordance with the supply of operation oil.

The rotary driving mechanism 204 includes a body 206 which is connected to sides of the pump-driving section 12 and the pump mechanism 16, a rotary shaft 202 which is axially supported rotatably in an insertion hole 208 formed in the body 206, a rotary disk member 212 which is connected to a substantially central portion of the rotary shaft 202 and which is arranged in a space 210 of the body 206, and seal sections (liquid tightness-retaining sections) 97a, 97b which retain liquid tightness between the interior and the exterior of the body 206.

Operation oil is supplied from the pump mechanism 16 to the rotary driving mechanism 204 under a driving action of the pump-driving section 12. When operation oil is supplied into the space 210, the rotary disk member 212 rotates, and the rotary shaft 202, which is connected to a substantially central portion of the rotary disk member 212, rotates integrally therewith. In this arrangement, respective ends of the rotary shaft 202 are retained by seal sections 97a, 97b, which are provided in the insertion hole 208 of the body 206. Further, a lubricant (for example, grease) 130 is supplied to the installation grooves (grooves) 120a, 120b of the seal sections 97a, 97b through the oil supply ports 134. The lubricant 130 has characteristics (for example, viscosity) different from those of the operation oil supplied to the rotary driving mechanism 204.

The lubricant 130, which is supplied to the installation grooves 120a, 120b, preferably is retained within the first oil-retaining members 140a. Further, the lubricant 130 is supplied to the first and second packings 216, 218, the retaining grooves 124a, 124b, and the dust-removing members 220, via clearances 214 formed between the outer circumferential surface (outer wall surface) of the rotary shaft 202 and the inner circumferential surface of the insertion hole 208.

Therefore, operation oil, which flows through the pump mechanism 16 and the rotary driving mechanism 204, possesses characteristics that are suitable for flowing through the fluid circuit. Further, the lubricant 130, which has different characteristics suitable for lubrication, can be supplied to the seal sections 97a, 97b separately from the operation oil. As a result, operation oil flows successfully and smoothly to the interior of the pump mechanism 16 and the rotary driving mechanism 204, so that the rotary disk member 212 can be effectively driven and rotated. Further, it is possible to improve durability, because the seal sections 97a, 97b are effectively lubricated using an optimal lubricant 130.

Figure 6:
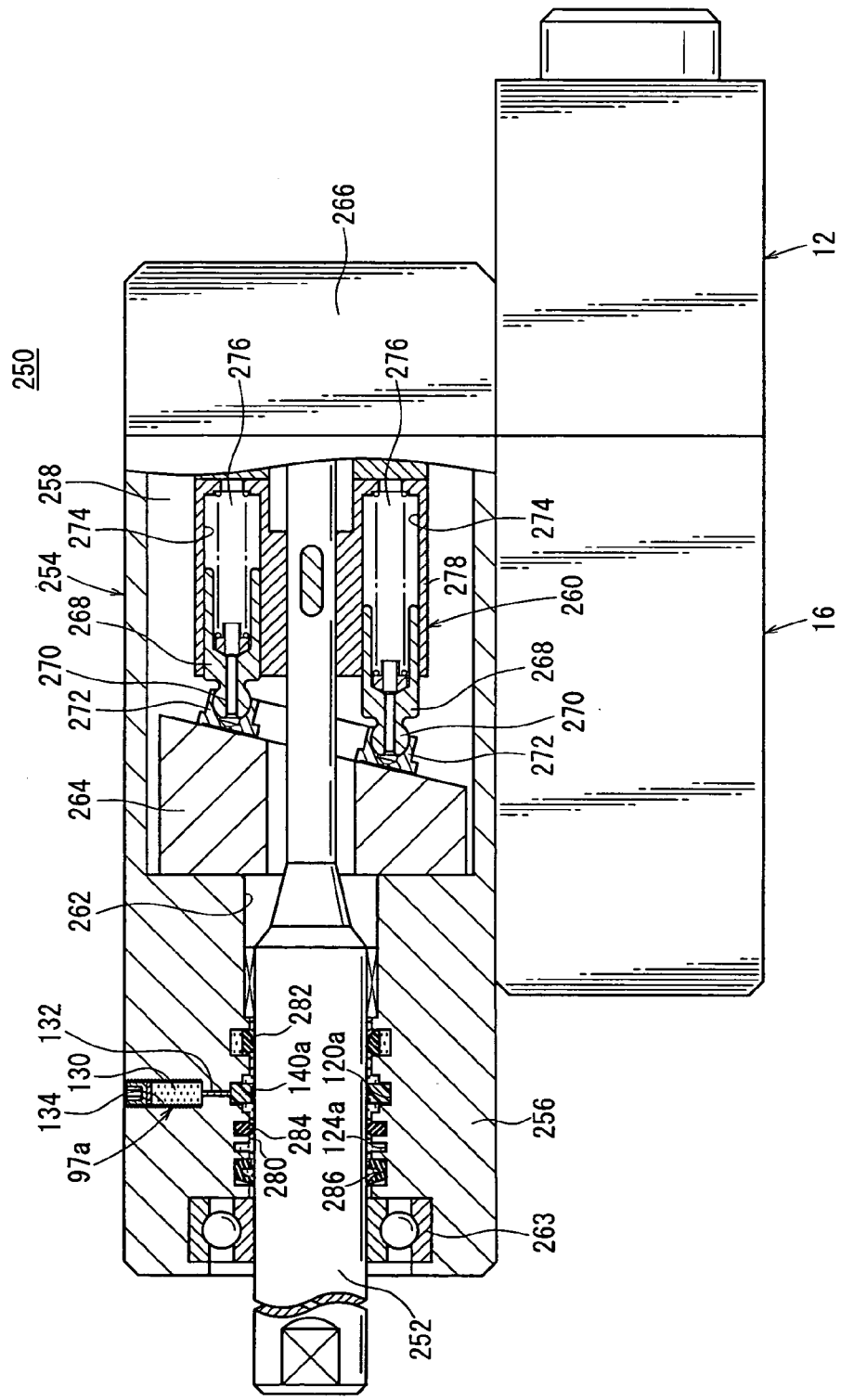
FIG. 6 shows, with partial omission, a longitudinal sectional view illustrating a continuously variable hydraulic transmission, to which a lubricating structure for a hydraulic driving apparatus according to a third embodiment of the present invention is applied.

Next, FIG. 6 shows a hydraulic continuously variable transmission (hydraulic driving apparatus) 250, to which a lubricating structure for a hydraulic driving apparatus according to a third embodiment of the present invention is applied. The same constitutive components as those of the actuator 10, employing the lubricating structure according to the first embodiment, as described above, are designated by the same reference numerals, and detailed explanation thereof shall be omitted.

The hydraulic continuously variable transmission 250, employing the lubricating structure for the hydraulic driving apparatus according to the third embodiment, comprises a pump-driving section 12 which is driven and rotated in accordance with a supplied current, a pump mechanism 16 which is integrally connected to a side of the pump-driving section 12, and which has a sucking/discharging section that is energized/deenergized by the pump-driving section 12, and a rotary driving mechanism 254 which is integrally provided on sides of the pump-driving section 12 and the pump mechanism 16, and which drives and rotates a rotary shaft 252 in accordance with operation oil supplied thereto.

The hydraulic continuously variable transmission 250 comprises a so-called HST (Hydro Static Transmission). The pump mechanism 16 and the pump-driving section 12 are connected via piping, wherein the pump mechanism 16 is driven by the engine of a vehicle or the like to feed high pressure oil to the rotary driving mechanism 254. Accordingly, speed control is performed for the rotary driving mechanism 254. The transmission is made continuously variably by changing the discharge capacity, based on the pump mechanism 16 or the capacity of the rotary driving mechanism 254.

The rotary driving mechanism 254 includes a body 256, which is connected to sides of the pump-driving section 12 and the pump mechanism 16, a rotary shaft 252 which is composed of a stepped shaft penetrating through an operation oil-charging chamber 258 formed in the body 256, a sucking/discharging section 260 which is rotatable integrally with the rotary shaft 252 when the rotary shaft 252 is rotated, and a seal section 97a provided for an insertion hole 262 of the body 256 and which retains liquid tightness between the interior and exterior of the body 256. The rotary shaft 252 is rotatably supported about its axis by a bearing 263 which is provided in the insertion hole 262 of the body 256.

A substantially columnar inclined member 264, having an inclined surface with a substantially constant angle of inclination in the body 256, is provided for the sucking/discharging section 260. A retaining section 272, comprising an annular groove that engages with spherical sections 270 of a plurality of pump pistons 268, is formed on the inclined member 264 on the side thereof facing the end block 266.

An unillustrated power source is energized to drive and rotate the pump-driving section 12. Operation oil is introduced into the rotary driving mechanism 254 by the aid of the pump mechanism 16, under a driving action of the pump-driving section 12.

Operation oil is introduced into the chambers 276, which are surrounded and defined by the pump pistons 268 and the holes 274. The pump pistons 268 are displaced in the axial direction while being retained by the retaining section 272, under a pressing action effected by the operation oil. Accordingly, the cylinder block 278, which is engaged by the aid of the holes 274, is rotated under displacement actions of the plurality of pump pistons 268. Accordingly, the rotary shaft 252 is driven and rotated in an integrated manner.

In this arrangement, one end of the rotary shaft 252 is retained by the seal section (liquid tightness-retaining section) 97a provided in the insertion hole 262 of the body 256. A lubricant (for example, grease) 130 is supplied to the installation groove 120a of the seal section 97a through the oil supply port 134. The lubricant 130 has characteristics (for example, viscosity) that are different from those of the operation oil supplied to the rotary driving mechanism 254.

The lubricant 130, which is supplied to the installation groove 120a, preferably is retained within the first oil-retaining member 140a. Further, the lubricant 130 is supplied to the first and second packings 282, 284, the retaining groove 124a, and the dust-removing member 286, via the clearance 280 formed between the outer circumferential surface of the rotary shaft 252 and the inner circumferential surface of the insertion hole 262.

Therefore, operation oil, which flows through the pump mechanism 16 and the rotary driving mechanism 254, can possess characteristics suitable for flowing through the fluid circuit. Further, the lubricant 130, which has different characteristics suitable for lubrication, can be supplied to the seal section 97a separately from the operation oil. As a result, operation oil flows successfully and smoothly to the interior of the pump mechanism 16 and the rotary driving mechanism 204, so that the rotary shaft 252 can be effectively driven and rotated by rotating the sucking/discharging section 260. Further, it is possible to improve durability, because the seal section 97a is effectively lubricated using an optimal lubricant 130.

Figure 7:
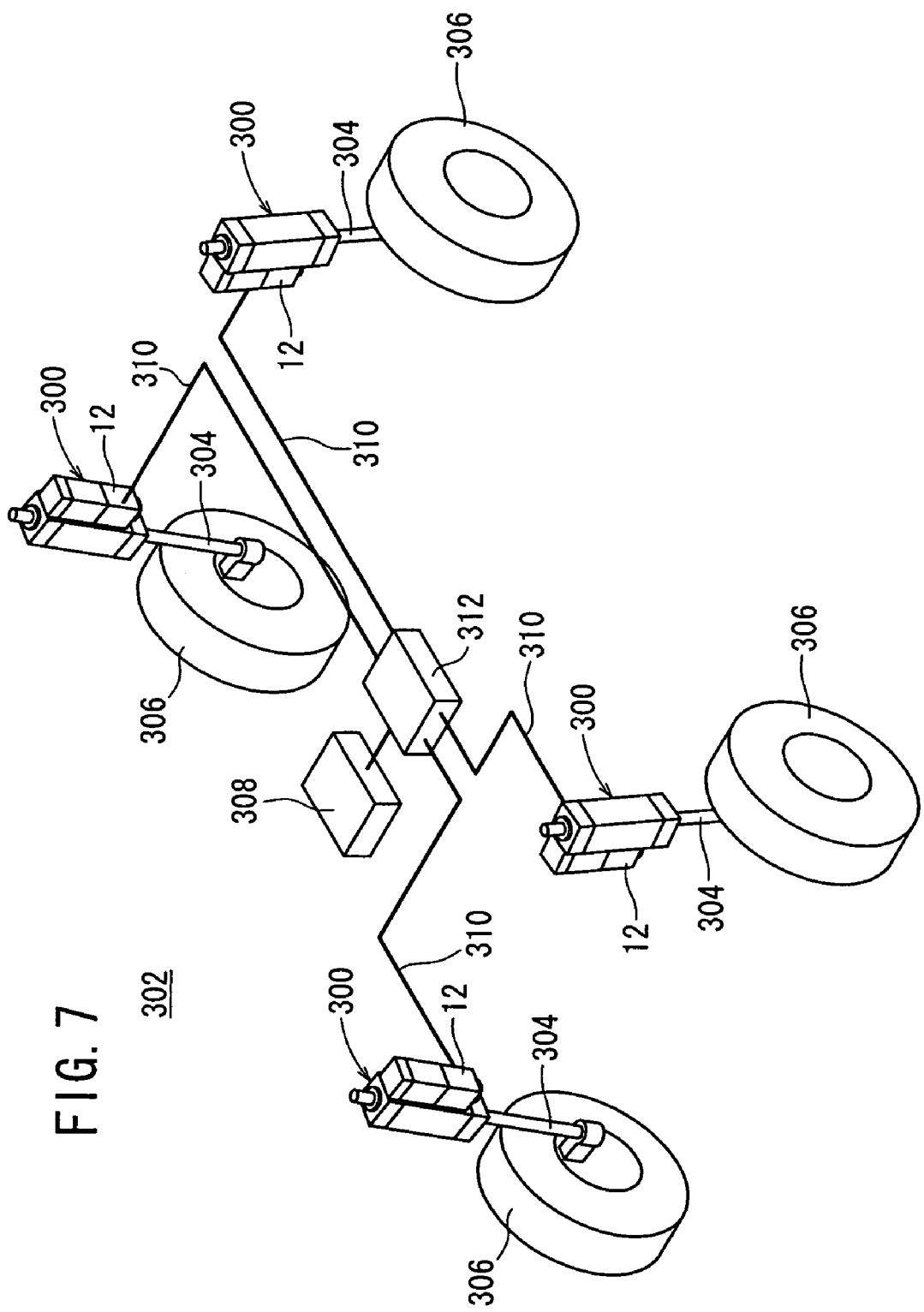
FIG. 7 shows a schematic arrangement illustrating a state in which the actuators shown in FIG. 1 are provided integrally with a vehicle suspension system.

Next, FIG. 7 shows another embodiment in which actuators 300, employing the lubricating structure for the hydraulic driving apparatus, are disposed integrally with suspensions 304 making up a suspension system of a vehicle 302. The same constitutive components as those of the actuator 10, employing the lubricating structure according to the first embodiment, as described above, are designated by the same reference numerals, and detailed explanation thereof shall be omitted.

The actuators 300 are disposed integrally with suspensions 304, wherein each of the suspensions 304 supports a wheel 306 with respect to a body of the vehicle 302, such as an automobile, and wherein the suspensions 304 buffer shocks imposed on the vehicle from the road surface via the wheels 306. The actuators 300 are each disposed respectively so that the axes thereof are substantially parallel to the axes of the suspensions 304.

On the other hand, a CPU 308 is carried in the vehicle 302. A driver 312 is connected to CPU 308 via a lead wire 310. Further lead wires 310, which are connected to the driver 312, are connected respectively to the pump-driving sections 12 of the actuators 300, which are installed corresponding to the respective wheels 306.

That is, the running condition of the vehicle 302, and road surface conditions, are detected by various sensors (not shown) provided on the vehicle 302. A control signal, based on the detection result, is outputted from the CPU 308 via the driver 312 to the respective actuators 300. Therefore, the actuators 300 undertake displacement actions depending on the running condition of the vehicle 302 and road surface conditions, and thus it is possible to effectively and reliably suppress shocks exerted from the road surface while the vehicle 302 is running.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A lubricating structure for a hydraulic driving apparatus comprising a body supporting a drive shaft, wherein said drive shaft is driven rectilinearly or rotationally by an operation oil supplied to said body, and further comprising a liquid tightness-retaining section providing a sealing function between said drive shaft and said body, said liquid tightness-retaining section comprising:
   an oil supply port which is openable to an exterior of said body;
   a groove communicating with said oil supply port via a passage, said groove being formed annularly along an inner circumferential surface of a support portion of said body for supporting said drive shaft in said body; and
   an oil-retaining member installed in said groove, said oil-retaining member being composed of a resin material,
   wherein a lubricant, which is supplied from said oil supply port, permeates into and is supported within said oil-retaining member, said lubricant further being supplied to a clearance formed between an outer circumferential surface of said drive shaft and said inner circumferential surface of said body, and wherein said lubricant has characteristics different from those of said operation oil.

2. The lubricating structure for said hydraulic driving apparatus according to claim 1, wherein a plate member is disposed in said oil supply port on a surface of said lubricant, and a closing member is connected to said oil supply port on a side of said plate member which is opposite of said lubricant, whereby said oil supply port is closed by said plate member and said closing member.

3. The lubricating structure for said hydraulic driving apparatus according to claim 2, wherein an amount of said lubricant supplied to said oil-retaining member and to said clearance is adjustable by displacing said closing member connected to said oil supply port.

4. The lubricating structure for said hydraulic driving apparatus according to claim 1, wherein said oil-retaining member comprises polyvinyl flouride resin.

5. The lubricating structure for said hydraulic driving apparatus according to claim 1, wherein an inner circumferential surface of said oil-retaining member, which is opposed to said drive shaft, comprises a wave shaped surface.

6. The lubricating structure for said hydraulic driving apparatus according to claim 1, wherein said lubricant comprises grease.

7. The lubricating structure for said hydraulic driving apparatus according to claim 1, wherein said lubricant has a viscosity that is larger than a viscosity of said operation oil.

8. The lubricating structure for said hydraulic driving apparatus according to claim 7, wherein said viscosity of said lubricant is set to be within a range of 32 to 100,000 cSt, and said viscosity of said operation oil is set to be within a range of 32 to 460 cSt.

9. The lubricating structure for said hydraulic driving apparatus according to claim 1, wherein a dust-removing member for removing dust adhered to said outer circumferential surface of said drive shaft is provided in said groove of said body, wherein a forward end of said dust-removing member makes continuous contact with said outer circumferential surface of said drive shaft.

10. The lubricating structure for said hydraulic driving apparatus according to claim 9, wherein said forward end of said dust-removing member is inclined by a predetermined angle in a direction away from said oil-retaining member, and said lubricant, which fills said clearance of said body, is prevented from leaking outside by maintaining said forward end in contact with said outer circumferential surface of said drive shaft.

11. The lubricating structure for said hydraulic driving apparatus according to claim 1, wherein said liquid tightness-retaining section further comprises a pair of oil-retaining members separated from each other by a predetermined distance in an axial direction of said body.

12. The lubricating structure for said hydraulic driving apparatus according to claim 1, wherein said body comprises an oil-charging groove opposed to said outer circumferential surface of said drive shaft, wherein said lubricant is charged into said oil-charging groove via said clearance.

13. The lubricating structure for said hydraulic driving apparatus according to claim 1, wherein an operation oil-blocking member is disposed in said body, separated from said oil-retaining member by a predetermined distance, said oil-blocking member blocking leakage of said operation oil in said body.

14. The lubricating structure for said hydraulic driving apparatus according to claim 1, wherein said hydraulic driving apparatus comprises an actuator, said actuator comprising:
   a cylindrical cylinder tube;
   a pair of cover members installed to ends of said cylinder tube respectively;
   a piston disposed for displacement in an axial direction in said cylinder tube; and
   piston rods connected to said piston and which are inserted through each of said cover members respectively.

* * * * *